United States Patent [19]

Aldrich

[11] 3,966,654

[45] June 29, 1976

[54] STABLE ROSIN DISPERSIONS

[75] Inventor: Paul H. Aldrich, Greenville, Del.

[73] Assignee: Hercules Incorporated, Wilmington, Del.

[22] Filed: Aug. 1, 1975

[21] Appl. No.: 601,566

Related U.S. Application Data

[63] Continuation of Ser. No. 386,135, Aug. 6, 1973, abandoned.

[52] U.S. Cl. .......................... 260/24; 162/164 EP; 162/180
[51] Int. Cl.² ........................................ C08L 93/04
[58] Field of Search .............. 260/24; 162/164, 180

[56] References Cited
UNITED STATES PATENTS

| | | | |
|---|---|---|---|
| 2,995,483 | 8/1961 | Bonzagni | 162/180 |
| 3,186,900 | 6/1965 | DeYoung | 162/180 X |
| 3,248,353 | 4/1966 | Coscia | 162/164 X |
| 3,526,524 | 9/1970 | Kulick | 162/180 X |

Primary Examiner—Lewis T. Jacobs
Attorney, Agent, or Firm—Charles L. Board

[57] ABSTRACT

Disclosed are essentially stable aqueous dispersions of fortified rosin which consist essentially of fortified rosin in finely-divided form; a water-soluble cationic resin, a specific example of which is a water-soluble cationic aminopolyamide—epichlorohydrin resin; and water. The fortified rosin dispersion is used to size paper.

21 Claims, No Drawings

STABLE ROSIN DISPERSIONS

This is a continuation of application Ser. No. 386,135, filed Aug. 6, 1973, now abandoned.

This invention relates to novel aqueous dispersions of fortified rosin. Particularly, this invention relates to aqueous dispersions which consist essentially of finely-divided fortified rosin particles, a water-soluble cationic dispersing agent for the finely-divided rosin particles, and water. The dispersing agent will be detailed more fully hereinafter. The novel fortified rosin dispersions of this invention are used to size paper.

Internal sizing of paper with rosin is discussed by Casey, *Pulp and Paper*, Second Edition, Volume II: Papermaking, Chapter XIII, pages 1043–1066, reference to which is hereby made.

At page 1048 Casey discusses fortified rosin size and states that fortified rosin sizes are made by reacting maleic anhydride or other dienolphiles with rosin to increase the number of carboxylic acid groups. Casey also states that a typical fortified size may contain about 1 to 30% of maleopimaric acid anhydride.

Casey, at page 1047, under the heading "Free Rosin Size", states that the relative merits of high free rosin size and low free rosin size has been a controversial subject for many years but that it is now pretty generally recognized that high free rosin size results in better sizing and uses less alum.

At page 1050, under the heading "Protected Rosin Size", Casey states that by using a protective colloid it is possible to prepare highly stable size containing as high as 90% free rosin. At page 1051 Casey discusses the Bewoid process for preparing a high free rosin size and states that Bewoid size, as usually prepared, contains about 90% free rosin dispersed in a small amount of rosin soap and stabilized by the presence of about 2% casein or other protein. The casein is used as a protective colloid to prevent growth of rosin particles, thereby maintaining them in a state of fine subdivision.

Casey, at pages 1051 and 1052, discusses the Prosize process for producing a protected size containing a high free rosin content. The rosin particles are prevented from growing into larger aggregates by the presence of a surface-active protein such as soybean protein.

German Pat. No. 1,131,348 states that free rosin sizes are dispersions of unsaponified resin acids with a certain percentage of rosin soap. It is also stated that the dispersions are prepared by a special process, that they are mostly used with free rosin content of 60 to 95% and contain besides rosin auxiliary emulsifiers and stabilizers such as stearates, triethanolamine, casein, and waxes.

German Pat. No. 1,131,348 further states that, heretofore, the fortified rosins have not been suitable for the preparation of dispersions since they have mostly too high melting points, have a tendency to crystallization, or form, during dispersing, fine crusts which lead to sedimentation phenomena. German Pat. No. 1,131,348 discloses and claims a paper size and a process for the preparation of a paper size in the form of an aqueous dispersion with a high free rosin content from fortified rosin characterized in that the fortified rosin is mixed with fatty acids, fatty acid mixtures, and/or naphthenic acids at elevated temperatures and that the dispersion is carried out in the known manner.

U.S. Pat. No. 3,565,755 discloses a substantially homogeneous stable aqueous suspension of rosin-base material in a state of fine subdivision. The rosin-base material can be all fortified rosin or it can be a rosin-fortified rosin mixture. A very small amount of the rosin-base mateial is saponified and functions as a dispersing agent for the rosin-base particles. This composition, which consists essentially of the rosin-base material, the saponified rosin-base material, and water, is used in the sizing of paper. The size of U.S. Pat. No. 3,565,755 is a high free rosin size in that it contains only a very small amount of saponified rosin-base material. Further, it has good stability (good shelf life) for prolonged periods of time and does not require the use of the stabilizers heretofore used in the preparation of stable high free rosin sizes such, for example, as casein and soybean protein.

In accordance with this invention there are provided aqueous dispersions of fortified rosin for use in the sizing of paper. The aqueous dispersions of this invention have good stability and do not require the presence of rosin soap or fortified rosin soap. In addition the aqueous dispersions of this invention do not require the use of stabilizers heretofore used in the preparation of high free rosin sizes.

The aqueous fortified rosin dispersions of this invention consist essentially of, by weight, from about 5% to about 50% fortified rosin, preferably from about 10% to about 40% fortified rosin, from about 0.5% to about 10% of dispersing agent (to be detailed more fully hereinafter), preferably from about 1% to about 8%; and the balance water to 100%.

The fortified rosin can be extended if desired by known extenders therefor such as waxes (particularly paraffin wax and microcrystalline wax); hydrocarbon resins including those derived from petroleum hydrocarbons and terpenes; and the like. This is accomplished by blending with the fortified rosin from about 10% to about 100% by weight based on the weight of fortified rosin of the fortified rosin extender.

Also blends of fortified rosin and rosin; and blends of fortified rosin, rosin and rosin extender can be used.

Fortified rosin—rosin blends will comprise about 25% to 95% fortified rosin and about 75% to 5% rosin. Blends of fortified rosin, rosin, and rosin extender will comprise about 25% to 45% fortified rosin, about 5% to 50% rosin, and about 5% to 50% rosin extender.

In preparing aqueous fortified rosin dispersions of this invention the fortified rosin (including the extender or rosin or both if either or both are to be employed) is first dissolved in a water-immiscible organic solvent therefor such, for example, as benzene, xylene, chloroform, and 1,2-dichloropropane. Mixtures of two or more solvents can be used if desired. The selected solvent will also be nonreactive to the components of the aqueous dispersion to be subsequently prepared.

The organic solvent-fortified rosin solution is then mixed with an aqueous solution of cationic resin dispersing agent to provide an emulsion which is essentially unstable and in which the organic solvent-fortified rosin solution forms the dispersed phase. The essentially unstable aqueous emulsion is then subjected to extreme shear to provide an essentially stable aqueous emulsion. Extreme shear is conveniently accomplished by means of an homogenizer. Thus passing, at least once, the unstable aqueous emulsion through an homogenizer under a pressure of the order of from about 1000 p.s.i.g. to about 8000 p.s.i.g., will provide an essentially stable emulsion. Subsequently, the organic solvent component of the emulsion is removed from the emulsion and there is provided an essentially stable aqueous dispersion of fortified rosin particles.

The aqueous fortified rosin dispersions of this invention can be prepared by the inversion process as shown in Example 16. The fortified rosin-organic solvent solution is admixed with an aqueous solution of cationic resin dispersing agent in an amount to provide a stable water-in-oil emulsion which is subsequently inverted to a stable oil-in-water emulsion by the rapid addition of water with vigorous stirring. The organic solvent is subsequently removed as by distillation under reduced pressure.

The rosin used to prepare the fortified rosin employed in this invention can be any of the commercially available types of rosin, such as wood rosin, gum rosin, tall oil rosin, and mixtures of any two or more, in their crude or refined state. Partially or substantially completely hydrogenated rosins and polymerized rosins, as well as rosins that have been treated to inhibit crystallization such as by heat treatment or reaction with formaldehyde, can be employed.

The fortified rosin employed is the adduct reaction product of rosin and an acidic compound containing the

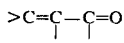

group and is derived by reacting rosin and the acidic compound at elevated temperatures of from about 150°C. to about 210°C.

The amount of acidic compound employed will be that amount which will provide fortified rosin containing from about 1% to about 12% by weight of adducted acidic compound based on the weight of the fortified rosin. Methods of preparing fortified rosin are disclosed and described in U.S. Pat. Nos. 2,628,918 and 2,684,300, reference to which is hereby made.

Examples of acidic compounds containing the

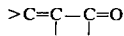

group that can be used to prepare the fortified rosin include the alpha-beta-unsaturated organic acids and their available anhydrides, specific examples of which include fumaric acid, maleic acid, acrylic acid, maleic anhydride, itaconic acid, itaconic anhydride, citraconic acid, and citraconic anhydride. Mixtures of acids can be used to prepare the fortified rosin if desired. Also mixtures of different fortified rosins can be used if desired. Thus, for example, a mixture of the acrylic acid adduct of rosin and the fumaric acid adduct can be used to prepare the novel dispersions of this invention. Also fortified rosin that has been substantially completely hydrogenated after adduct formation can be used.

If rosin (that is, unfortified rosin) is used in combination with fortified rosin, it can be any of the commercially available types of rosin, such as wood rosin, gum rosin, tall oil rosin, and mixtures of any two or more, in their crude or refined state. Partially or substantially completely hydrogenated rosins and polymerized rosins, as well as rosins that have been treated to inhibit crystallization such as by heat treatment or reaction with formaldehyde, can be employed.

The dispersing agents used to prepare the substantially stable aqueous dispersions of this invention are cationic polymeric resinous materials that are water-soluble.

Particularly suitable dispersing agents are the cationic thermosettable water-soluble aminopolyamide--epichlorohydrin resins disclosed and described in U.S. Pat. Nos. 2,926,116 and 2,926,154. These resins are water-soluble polymeric reaction products of epichlorohydrin and an aminopolyamide. The aminopolyamide is derived by reaction of a dicarboxylic acid and a polyalkylenepolyamine in a mole ratio of polyalkylenepolyamine to dicarboxylic acid of from about 0.8:1 to about 1.4:1.

Particularly suitable dicarboxylic acids are diglycolic acid and saturated aliphatic dicarboxylic acids containing from 3 through 10 carbon atoms such as malonic acid, succinic acid, glutaric acid, adipic acid, pimelic acid, suberic acid, azelaic acid, and sebacic acid.

Other suitable dicarboxylic acids include terephthalic acid, isophthalic acid, phthalic acid, maleic acid, fumaric acid, itaconic acid, glutaconic acid, citraconic acid, and mesaconic acid.

The available anhydrides of the above acids can be used in preparing the water-soluble aminopolyamide as well as the esters of the acids. Mixtures of two or more dicarboxylic acids, their anhydrides, and their esters can be used to prepare the water-soluble aminopolyamides, if desired.

A number of polyalkylene polyamines, including polyethylene polyamines, polypropylene polyamines, polybutylene polyamines and the like can be employed. Polyalkylene polyamines can be represented as polyamines in which the nitrogen atoms are linked together by groups of the formula $-C_nH_{2n}-$ where n is a small integer greater than unity and the number of such groups in the molecule ranges from two up to about eight. The nitrogen atoms can be attached to adjacent carbon atoms in the group $-C_nH_{2n}-$ or to carbon atoms farther apart, but not to the same carbon atom. Polyamines such as diethylenetriamine, triethylenetetramine, tetraethylenepentamine, and dipropylenetriamine, which can be obtained in reasonably pure form are suitable for preparing water-soluble aminopolyamides. Other polyalkylene polyamines that can be used include methyl bis-(3-aminopropyl)amine; methyl bis-(2-aminoethyl)amine; and 4,7-dimethyltriethylenetetramine. Mixtures of polyalkylene polyamines can be used, if desired.

The spacing of an amino group on the aminopolyamide can be increased if desired. This can be accomplished by substituting a diamine such as ethylenediamine, propylenediamine, hexamethylenediamine and the like for a portion of the polyalkylene polyamine. For this purpose, up to about 80% of the polyalkylene polyamine can be replaced by a molecularly equivalent amount of diamine. Usually, a replacement of about 50% or less will be adequate.

Temperatures employed for carrying out reaction between the dicarboxylic acid and the polyalkylene polyamine can vary from about 110°C. to about 250°C. or higher at atmospheric pressure. For most purposes temperatures between about 160°C. and 210°C. are preferred. The time of reaction will usually vary from about ½ hour to 2 hours. Reaction time varies inversely with reaction temperatures employed.

In carrying out the reaction, it is preferred to use an amount of dicarboxylic acid sufficient to react substantially completely with the primary amine groups of the polyalkylene polyamine but insufficient to react with the secondary amine groups and/or tertiary amine groups to any substantial extent. This will usually require a mole ratio of polyalkylene polyamine to dicarboxylic acid of from about 0.9:1 to about 1.2:1. However, mole ratios of from about 0.8:1 to about 1.4:1 can be used. The aminopolyamide, derived as above described, is reacted with epichlorohydrin at a temperature of from about 45°C. to about 100°C., and preferably between about 45°C. and 70°C., until the viscosity of a 20% solids solution in water at 25°C. has reached about C or higher on the Gardner-Holdt scale. This reaction is preferably carried out in aqueous solution to moderate the reaction. pH adjustment is usually not necessary. However, since the pH decreases during the polymerization phase of the reaction, it may be desirable, in some cases, to add alkali to combine with at least some of the acid formed. When the desired viscosity is reached, water can be added to adjust the solids content of the resin solution to a desired amount, usually from about 2% to about 50%.

In the aminopolyamide-epichlorohydrin reaction, satisfactory results can be obtained utilizing from about 0.1 mole to about 2 moles of epichlorohydrin for each secondary or tertiary amine group of the aminopolyamide, and preferably from about 1 mole to about 1.5 moles of epichlorohydrin.

A monofunctional alkylating agent can be employed as an additional reactant in carrying out the above reaction, if desired. A monofunctional alkylating agent can be first reacted with the aminopolyamide followed by raction of the aminopolyamide-alkylating agent reaction product with epichlorohydrin, or the alkylating agent can be reacted with the aminopolyamide-epichlorohydrin reaction product. Thus, for example, epichlorohydrin can be added to an aqueous solution of the aminopolyamide at a temperature from about 45° to 55°C. The reaction mixture is then heated at a temperature from about 50° to 100°C., and preferably from about 60° to 80°C., depending upon the rate of reaction desired. After a suitable time at this temperature, i.e., from about 10-100 minutes, and preferably until the viscosity of an approximately 25% solids solution of the reaction mixture at 25°C. is from A to B on the Gardner-Holdt scale, at which time most of the epoxy groups of the epichlorohydrin have reacted with the amine groups of the aminopolyamide, a monofunctional alkylating agent is added and the reaction mixture heated, preferably at a temperature from about 60°C. to about 80°C., until the viscosity of an approximately 25% solids solution at 25°C. is at least A and preferably at least B to C on the Gardner-Holdt scale. The solids-viscosity relationship can be obtained by direct reaction at the 25% level followed by dilution to 25% solids, or reaction at a lower level followed by concentration at less than 40°C. and under reduced pressure to 25% solids. Lower alkyl esters of mineral acids such as the halides, sulfates and phosphates, substituted alkyl halides, and the like are suitable monofunctional alkylating agents. Illustrative of the compounds which can be used are dimethyl, diethyl and dipropyl sulfate; methyl chloride; methyl iodide; ethyl iodide; methyl bromide; propyl bromide; and the mono-, di- or tri-methyl, ethyl and propyl phosphates. Certain aromatic compounds such as benzyl chloride and methyl p-toluene sulfonate can be used. From about 0.1 mole to about 0.9 mole of monofunctional alkylating agent for each amine group can be used.

In the examples that follow, all parts and percentages are by weight unless otherwise specified. Sizing results are set forth in some of the examples. Sizing results are determined on the Hercules Sizing Tester. The sizing test determines the resistance of a sized sheet of paper to penetration by No. 2 Test Solution, (an aqueous solution of, by weight, 1.0% formic acid and 1.25% naphthol Green B). The time necessary for ink penetration to reduce light reflectance either 80% or 85% (as indicated in the examples) of the sheet's initial value is used to represent the degree of sizing.

The following example is illustrative of the preparation of an aminopolyamide-epichlorohydrin resin that is particularly useful as a cationic resin dispersing agent for use in this invention.

EXAMPLE A

An aminopolyamide is formed by adding 219.3 parts of adipic acid slowly, with stirring, to 151.3 parts of diethylenetriamine in a flask fitted with a stirrer and a condenser for collecting water distillate. The reaction mixture is stirred and heated at 170°–180°C. under a nitrogen blanket until amide formation is complete. After air cooling to approximately 140°C., hot water is added with stirring to provide a 50% solids solution of polyamide resin with an intrinsic viscosity of 0.140 measured by using a 2% solution in 1 N $NH_4Cl$. An epichlorohydrin derivative of the aminopolyamide is prepared by adding about 110.25 parts of water to about 50 parts of the 50% solids solution and then adding 14.0 parts (0.157 mole) of epichlorohydrin. The reaction mixture is heated at 70°C. with stirring under a reflux condenser until the Gardner-Holdt viscosity attains a value of E to F. The reaction mixture is diluted with water to a solids content of about 12.5%.

Other suitable dispersing agents that can be used in this invention are the water-soluble alkylene polyamine-epichlorohydrin resins which are water-soluble polymeric reaction products of epichlorohydrin and an alkylene polyamine.

Alkylene polyamines which can be reacted with epichlorohydrin have the formula $H_2N(C_nH_{2n}NH)_xH$ wherein $n$ is an integer 2 through 8 and $x$ is an integer 1 or more, preferably 1 through 6. Examples of such alkylene polyamines are the alkylene diamines such as ethylenediamine; propylene diamine-1,2; propylene diamine-1,3; tetramethylenediamine; and hexamethylenediamine. The polyalkylene polyamines such as the polyethylene polyamines, polypropylene polyamines, polybutylene polyamines and the like are examples of alkylene polyamines that can be used. Specific examples of these polyalkylene polyamines include diethylenetriamine, triethylenetetramine, tetraethylenepentamine, and dipropylenetriamine. Other polyalkylene polyamines that can be used include methyl bix(3-aminopropyl)amine; methyl bis(2-aminoethyl)amine; and 4,7-dimethyltriethylenetetramine. Mixtures of alkylene polyamines can be used if desired.

The relative proportions of alkylene polyamine and epichlorohydrin employed can be varied depending upon the particular alkylene polyamine used. In general, it is preferred that the molar ratio of epichlorohydrin to alkylene polyamine be in excess of 1:1 and less than 2:1. In the preparation of a water-soluble resin from epichlorohydrin and tetraethylenepentamine, good results are obtained at molar ratios of from about 1.4:1 to 1.94:1. Reaction temperature is preferably in the range of from about 40° to about 60°C.

The following example illustrates the preparation of a dispersing agent of the above type.

EXAMPLE B

To a mixture of 29.2 parts triethylenetetramine and 70 parts water is added 44.4 parts epichlorohydrin over a period of about 12 minutes with periodic cooling. After the epichlorohydrin addition is complete, the reaction mixture is heated to 75°C. and maintained at a temperature of from about 70°C. to about 77°C. for about 33 minutes, at which point the Gardner-Holdt viscosity reached about I. The resulting reaction mass is diluted with 592 parts water to provide an aqueous solution that has a solids content of about 11.7% and a pH of about 6.3.

Another suitable dispersing agent for use in this invention is a poly(diallylamine)-epihalohydrin resin. Resins of this type can be prepared in accordance with the teachings of U.S. Pat. No. 3,700,623, reference to which is hereby made.

A poly(diallylamine)-epihalohydrin resin is the resinous reaction product (A) a linear polymer having units of the formula

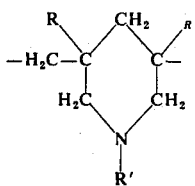

(I)

where R is hydrogen or lower alkyl and R' is hydrogen, alkyl or a substituted alkyl group and (B) an epihalohydrin.

In the above formula, each R can be the same or different and, as stated, can be hydrogen or lower alkyl. The alkyl groups contain from 1 to 6 carbons and are preferably methyl, ethyl, isopropyl or n-butyl. R' of the formula represents hydrogen, alkyl or substituted alkyl groups. The R' alkyl groups will contain from 1 to 18 carbon atoms (preferably from 1 to 6 carbon atoms) such as methyl, ethyl, propyl, isopropyl, butyl, tertbutyl, hexyl, octyl, decyl, dodecyl, tetradecyl, and octadecyl. R' can also be substituted alkyl group. Suitable substituents include, in general, any group which will not interfere with polymerization through a vinyl double bond. Typically, the substituents can be carboxylate, cyano, ether, amino (primary, secondary or tertiary), amide, hydrazide and hydroxyl.

Polymers having units of the above formula can be produced by polymerizing the hydrohalide salt of a diallylamine

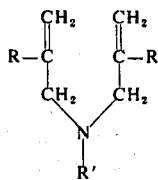

(II)

where R and R' are as indicated above, either alone or as a mixture with other copolymerizable ingredients, in the presence of a free radical catalyst and then neutralizing the salt to give the polymer free base.

Specific hydrohalide salts of the diallylamines which can be polymerized to provide the polymer units of the invention include diallylamine hydrochloride; N-methyldiallylamine hydrochloride; N-methyldiallylamine hydrobromide; 2,2'dimethyl-N-methyldiallylamine hydrochloride; N-ethyldiallylamine hydrobromide; N-isopropyldiallylamine hydrochloride; N-n-butyldiallylamine hydrobromide; N-tert-butyldiallylamine hydrochloride; N-n-hexyldiallylamine hydrochloride; N-octadecyldiallylamine hydrochloride; N-acetamidodiallylamine hydrochloride; N-cyanomethyldiallylamine hydrochloride; N-$\beta$-propionamidodiallylamine hydrobromide; N-carboethoxymethyldiallylamine hydrochloride; N-$\beta$-methoxyethyldiallylamine hydrobromide; N-$\beta$-aminoethyldiallylamine hydrochloride; N-hydroxyethyldiallylamine hydrobromide; and N-acetohydrazide substituted diallylamine hydrochloride.

Diallylamines and N-alkyldiallylamines, used to prepare the polymers employed in this invention, can be prepared by the reaction of ammonia or a primary amine with an allyl halide employing as a catalyst for the reaction of a catalyst that promotes the ionization of the halide such, for example, as sodium iodide, zinc iodide, ammonium iodide, cupric bromide, ferric chloride, ferric bromide, zinc chloride, mercuric iodide, mercuric nitrate, mercuric bromide, mercuric chloride, and mixtures of two or more. Thus, for example, N-methyldiallylamine can be prepared by reaction of two moles of an allyl halide, such as allyl chloride, with one mole of methylamine in the presence of an ionization catalyst such as one of those enumerated above.

In preparing the homopolymers and copolymers, reaction can be initiated by redox catalytic system. In a redox system, the catalyst is activated by means of a reducing agent which produces free radicals without the use of heat. Reducing agents commonly used are sodium metabisulfite and potassium metabisulfite. Other reducing agents include water-soluble thiosulfates and bisulfites, hydrosulfites and reducing salts such as the sulfate of a metal which is capable of existing in more than one valence state such as cobalt, iron, manganese and copper. A specific example of such a sulfate is ferrous sulfate. The use of a redox initiator system has several advantages, the most important of which is efficient polymerization at lower temperatures. Conventional peroxide catalysts such as tertiary-butyl hydroperoxide, potassium persulfate, hydrogen peroxide, and ammonium persulfate used in conjunction with the above reducing agents or metal activators, can be employed.

As stated above, the linear polymers of diallylamines which are reacted with an epihalohydrin can contain different units of formula (I) and/or contain units of one or more other copolymerizable monomers. Typically, the comonomer is a different diallylamine, a monoethylenically unsaturated compound containing a single vinyl or vinylidene group or sulfur dioxide, and is present in an amount ranging from 0 to 95 mole % of the polymer. Thus the polymers of diallylamine are linear polymers wherein from 5 to 100% of the recurring units have the formula (I) and from 0 to 95% of the recurring units are monomer units derived from (1) a vinylidene monomer and/or (2) sulfur dioxide. Preferred comonomers include acrylic acid, methacrylic acid, methyl and other alkyl acrylates and methacrylates, acrylamide, methacrylamide, acrylonitrile, methacrylonitrile, vinyl acetate, vinyl ethers such as the alkyl vinyl ethers, vinyl ketones such as methyl vinyl ketone and ethyl vinyl ketone, vinyl sulfonamide, sulfur dioxide or a different diallylamine embraced by the above formula (II).

Specific copolymers which can be reacted with an epihalohydrin include copolymers of N-methyldiallylamine and sulfur dioxide; copolymers of N-methyldiallylamine and diallylamine; copolymers of diallylamine and acrylamide; copolymers of diallylamine and acrylic acid; copolymers of N-methyldiallylamine and methyl acrylate; copolymers of diallylamine and acrylonitrile; copolymers of N-methyldiallylamine and vinyl acetate; copolymers of diallylamine and methyl vinyl ether; copolymers of N-methyldiallylamine and vinylsulfonamide; copolymers of N-methyldiallylamine and methyl vinyl ketone; terpolymers of diallylamine, sulfur dioxide and acrylamide; and terpolymers of N-methyldiallylamine, acrylic acid and acrylamide.

The epihalohydrin which is reacted with the polymer of a diallylamine can be any epihalohydrin, i.e., epichlorohydrin, epibromohydrin, epifluorohydrin or epiiodohydrin and is preferably epichlorohydrin. In general, the epihalohydrin is used in an amount ranging from about 0.5 mole to about 1.5 moles and preferably about 1 mole to about 1.5 moles per mole of secondary plus tertiary amine present in the polymer.

The poly(diallylamine)-epihalohydrin resin can be prepared by reacting a homopolymer or copolymer of a diallylamine as set forth above with an epihalohydrin at a temperature of from about 30°C. to about 80°C. and preferably from about 40°C. to about 60°C. until the viscosity measured on a solution containing 20 to 30% solids at 25°C. has reached a range of A to E and preferably about C to D on the Gardner-Holdt scale. The reaction is preferably carried out in aqueous solution to moderate the reaction, and at a pH of from about 7 to about 9.5.

When the desired viscosity is reached, sufficient water is added to adjust the solids content of the resin solution to about 15% or less and the product cooled to room temperature (about 25°C.).

The poly(diallylamine)-epihalohydrin resin can be stabilized against gelation by adding to the aqueous solution thereof sufficient water-soluble acid (such as hydrochloric acid and sulfuric acid) to obtain and maintain the pH at about 2.

The following example illustrates the preparation of a poly(diallylamine)-epichlorohydrin resin.

EXAMPLE C

A solution of 69.1 parts of methyldiallylamine and 197 parts of 20° Be hydrochloric acid in 111.7 parts of demineralized water is sparged with nitrogen to remove air, then treated with 0.55 part of tertiary butyl hydroperoxide and a solution of 0.0036 part of ferrous sulfate in 0.5 part of water. The resulting solution is allowed to polymerize at 60°–69°C. for 24 hours to give a polymer solution containing about 52.1% solids with an RSV of 0.22. 122 parts of the above solution is adjusted to pH 8.5 by the addition of 95 parts of 3.8% sodium hydroxide and then diluted with 211 parts of water and combined with 60 parts of epichlorohydrin. The mixture is heated at 45°–55°C. for 1.35 hours until the Gardner-Holdt viscosity of a sample cooled to 25°C. reaches B+. The resulting solution is acidified with 25 parts of 20° Be hydrochloric acid and heated at 60°C. until the pH becomes constant at 2.0. The resulting resin solution has a solids content of 20.8% and a Brookfield viscosity = 77 cp. (measured using a Brookfield Model LVF Viscometer, No. 1 spindle at 60 r.p.m. with guard).

EXAMPLE D

This example illustrates the preparation of fumaric acid fortified rosin. Fumaric acid, 6.5 parts, is adducted, at a temperature of about 205°C. with formaldehyde treated tall oil rosin, 93.5 parts. The fumaric acid dissolves in the fused tall oil rosin and reacts therewith to provide fumaric acid fortified tall oil rosin. After substantially all the fumaric acid has reacted with the tall oil rosin, the fortified rosin is cooled to room temperature (about 23°C.). The fortified rosin contains 6.5% fumaric acid, substantially all of which is in the combined or adducted form.

EXAMPLE 1

A solution is prepared by dissolving 300 parts of a fortified rosin as prepared in Example D in 300 parts benzene. This solution is thoroughly mixed with 400 parts (50 parts solids) of an aminopolyamide-epichlorohydrin resin solution prepared as in Example A diluted with 350 parts of water providing a premix which is homogenized twice at 2000 p.s.i.g. The resulting product is a stable oil-in-water emulsion. Substantially all of the benzene is removed from the emulsion by distillation under reduced pressure with the pot temperature at about 40°C. The solids content of the resulting dispersion is about 35%. Of the solids content about 30% is fortified rosin and about 5% is epichlorohydrin aminopolyamide-epichlorohydrin resin. The dispersion is stable for a period of about 6 months.

EXAMPLE 2

Example 1 is repeated using 200 parts fortified rosin prepared as in Example D dissolved in 200 parts benzene with 150 parts aminopolyamide-epichlorohydrin resin (18.8 parts solids) blended with 550 parts water. The solids content of the resulting aqueous dispersion is about 24%. Of the solids content about 22% is fortified rosin and about 2% is aminopolyamide-epichlorohydrin resin. The dispersion has good stability.

EXAMPLE 3

Example 1 is repeated using 750 parts aminopolyamide-epichlorohydrin resin (93.8 parts solids) with 750 parts water. The solids content of the resulting aqueous dispersion is about 22%. Of the solids content about 17% is fortified rosin and about 5% is aminopolyamide-epichlorohydrin resin. The dispersion has good stability.

EXAMPLE 4

Example 1 is repeated using 500 parts aminopolyamide-epichlorohydrin resin (62.5 parts solids) with 250 parts water. The solids content of the resulting aqueous dispersion is about 35%. Of the solids content about 29% is fortified rosin and about 6% is aminopolyamide-epichlorohydrin resin. The dispersion has good stability.

EXAMPLE 5

Example 1 is repeated using only 150 parts benzene to dissolve the fortified rosin and only 250 parts water to dilute the aminopolyamide-epichlorohydrin resin. The total solids of the resulting aqueous dispersion is about 37.5%. Of the solids content about 32% is fortified rosin and about 5.5% is aminopolyamide-epichlorohydrin resin. The dispersion has good stability.

EXAMPLE 6

Example 1 is repeated using 600 parts benzene to dissolve the fortified rosin. The total solids of the resulting aqueous dispersion is about 35%. Of the solids content about 30% is fortified rosin and about 5% is aminopolyamide-epichlorohydrin resin. The dispersion has good stability.

EXAMPLE E

This example illustrates the preparation of fumaric acid fortified rosin. Fumaric acid, 14 parts, is adducted, at a temperature of about 205°C. with formaldehyde treated tall oil rosin, 86 parts. The fumaric acid dissolves in the fused tall oil rosin and reacts therewith to provide fumaric acid fortified tall oil rosin. After substantially all the fumaric acid has reacted with the tall oil rosin, the fortified rosin is cooled to room temperature (about 23°C.). The fortified rosin contains 14% fumaric acif, substantially all of which is in the combined or adducted form.

EXAMPLE 7

A solution is prepared by dissolving 128.5 of fortified rosin as prepared in Example E, 21.5 parts formaldehyde treated tall oil rosin and 150 parts of a copolymer of vinyl toluene and α-methyl styrene which has a molecular weight of about 1400, a ring and ball softening point of about 120°C, and an acid number less than 1 in 300 parts benzene. This solution is thoroughly mixed with 400 parts (50 parts solids) of an aminopolyamide-epichlorohydrin solution prepared as in Example A diluted with 350 parts of water providing a premix which is homogenized twice at 3000 p.s.i. The resulting product is a stable oil-in-water emulsion from which substantially all of the benzene is subsequently removed by distillation under reduced pressure with the pot temperature at about 40°C. The solids content of the dispersion is about 33%. Of the solids content about 14.2% is vinyl toluene-α-methyl styrene copolymer, about 4.8% is aminopolyamide-epichlorohydrin resin, and about 1.9% is combined fumaric acid.

EXAMPLE 8

Example 7 is repeated using 134 parts formaldehyde-treated tall oil rosin and 37.5 parts vinyl toluene-α-methyl styrene copolymer. The solids content of the resulting dispersion is about 34%. Of the solids content about 3.6% is copolymer, about 4.8% is aminopolyamide-epichlorohydrin resin and about 1.9% is combined fumaric acid. The dispersion has good stability.

EXAMPLE 9

A solution is prepared by dissolving 128.5 parts of fortified rosin as prepared in Example E, 21.5 parts formaldehyde treated tall oil rosin and 150 parts of a fully refined paraffin wax (m.p. about 145°F.), in 300 parts benzene by mixing and warming at about 60°C. to dissolve the paraffin wax. This solution is thoroughly mixed with 400 parts (50 parts solids) of an aminopolyamide-epichlorohydrin resin solution prepared as in Example A diluted with 350 parts of water. Before mixing the two solutions, the diluted aminopolyamide-epichlorohydrin resin is warmed to about 60°C. The warm premix is homogenized twice at 4000 p.s.i. in an homogenizer which is preheated to about 60°C. The resulting product is a stable oil-in-water emulsion from which substantially all of the benzene is removed by distillation under reduced pressure with the pot temperature at 40° to 50°C. The total solids of the aqueous dispersion is about 31%. Of the solids about 13.8% is wax, about 4.4% is aminopolyamide-epichlorohydrin resin and about 1.8% is combined fumaric acid. The dispersion has good stability.

EXAMPLE 10

Example 9 is repeated using 141.5 parts formaldehyde treated tall oil rosin and 30 parts fully refined paraffin wax. The total solids of the resulting aqueous dispersion is about 36%. Of the solids about 3.1% is wax, about 5.2% is aminopolyamide-epichlorohydrin resin and about 2% is combined fumaric acid. The dispersion has good stability.

EXAMPLE F

A reaction kettle fitted with a steam jet vacuum system is charged with 704 parts water and 476 parts epichlorohydrin. The steam jet vacuum system is turned on to exhaust vapors through a condenser and prevent them from escaping through the open manhole. 420 parts of Amine 248 is added with agitation in 35 minutes while the temperature is allowed to rise to 70°C. Cooling water is required to limit the temperature rise to 70°C. After the amine addition is complete the resulting mixture has a pH of 7.8 and an A viscosity by Gardner-Holdt. Six parts of 20% NaOh is added to speed the reaction. After 2 hours and 40 minutes at about 70°C., the viscosity reaches a U+ viscosity and the resin solution is diluted with 640 parts of water which reduces the viscosity to about C−. A total of 44 parts 20% NaOH is added in four separate additions during a 1¾ hour period to speed reaction. An S viscosity is reached after 3 hours and 35 minutes, and the reaction is killed and diluted with 26 parts concentrated sulfuric acid in 1345 parts water. This gives an aqueous solution having a solids content of 23.3%, a D viscosity and a pH of 4.4. Additional $H_2SO_4$ and water are added to provide a solution having a pH of 4 and a solids content of 22.5%. The resin solution is filtered thru 100μ filter cartridges to give a total of 3336 parts product. Amine 248 is a commercially available liquid mixture of long chain aliphatic polyamines. At least 75% of Amine 248 consists of bis-(hexamethylene)-triamine and higher homologues. The remainder consists of lower molecular weight amines, nitriles, and lactams.

EXAMPLE 11

A solution is prepared by dissolving 300 parts of fortified rosin as prepared in Example D in 300 parts benzene. This solution is thoroughly mixed with 217.4 parts (50 parts solids) of the epichlorohydrin-polyamine reaction product prepared as in Example F and diluted with 533 parts of water providing a premix which is homogenized twice at 2000 p.s.i. The resulting product is a stable oil-in-water emulsion from which substantially all of the benzene is subsequently removed by distillation under reduced pressure at about 40°C. The solids content of the resulting dispersion is about 35%. Of the solids content about 30% is fortified rosin and about 5% is epichlorohydrin-polyamine reaction product. The dispersion has good stability.

EXAMPLE 12

A solution is prepared by dissolving 128.5 parts fortified rosin prepared as in Example E, 141.5 parts tall oil rosin and 30 parts fully refined parafin wax in 300 parts benzene by mixing and warming to 60°C. to dissolve the paraffin wax. This solution is thoroughly mixed with 217.4 parts (50 g. solids) of the epichlorohydrin-polyamine reaction product prepared as in Example F and diluted with 533 parts of water. Before mixing the two solutions, the diluted epichlorohydrin-poiyamine reaction product is warmed to about 60°C. The warmed premix is homogenized twice at 2000 p.s.i. in an homogenizer preheated to about 60C. The resulting product is a stable oil-in-water emulsion from which substantially all of the benzene is subsequently removed by distillation at atmospheric pressure during which the product temperature increases from about 75°C. to about 100°C. The solids content of the resulting dispersion is about 36.0%. Of the solids content about 3.1% is paraffin wax, about 5.2% is epichlorohydrin-polyamine reaction product and about 2% is combined fumaric acid. The dispersion has good stability.

EXAMPLE G

To a solution of 26.2 parts of iminobis(propylamine), also called bis(3-aminopropyl) amine, in 82 parts of water is added 55.6 parts of epichlorohydrin in one portion. The resulting mixture is held between about 43°C. and about 58°C. by external cooling for about 0.7 hour, until the exothermic phase of the reaction is over. The mixture is then heated at about 70°C. for about 0.8 hour, during which the viscosity of the mixture increases to a Gardner-Holdt viscosity in excess of J. The mixture is then diluted with 364 parts of water and adjusted to pH 4.5 with sulfuric acid. The resulting resin solution contains about 16.5% solids and has a Brookfield viscosity of 10 centipoises (No. 1 spindle, 60 rpm.).

EXAMPLE 13

Example 1 is repeated using 301 parts (50 parts solids) of an epichlorohydrin-polyamine reaction product prepared as in Example G with 300 parts of water as the aqueous phase. The premix is homogenized twice at 3000 p.s.i. The total solids of the resulting aqueous dispersion suspension is about 39%. Of the total solids about 5.6% is epichlorohydrin-polyamine reaction product and about 33% is fortified rosin. The dispersion has good stability.

EXAMPLE H

Seventy-four parts of epichlorohydrin is added to a solution of 37.8 parts of tetraethylenepentamine in 112 parts of water, during a period of 15 minutes. The temperature rises to about 55°C. The mixture is then heated externally and maintained at about 60°C. for one-half hour, then at 70°C. for about 3 hours, during which time the Gardner-Holdt viscosity reaches B, The resulting resin solution is then cooled to room temperature (about 25°C.) and aged for 11 days, during which the resin solution reaches a Gardner-Holdt viscosity of Z. The resin solution is then diluted with 524 parts water. The resulting solution contains about 15.3% non-volatile solids and has a Brookfield viscosity of 23 centipoises (Model LVF viscometer, No. 1 spindle, 60 rpm., 25°).

EXAMPLE 14

Example 13 is repeated using 327 parts (50 parts solids) epichlorohydrin-polyamine reaction product prepared as in Example H and 327 parts water as water phase. The total solids of the resulting product is about 37%. Of the total solids about 5.4% is epichlorohydrin-polyamine reaction product and about 32 % is fortified rosin.

EXAMPLE J

To 250 parts of methyldiallylamine is added slowly 230 parts 37% hydrochloric acid in about 240 parts demineralized water. The water is cooled as required to prevent volatilization of materials due to the heat of reaction. The pH of the resulting mixture is then adjusted to 3.1 by addition of additional (19 parts) methyldiallylamine. After the oxygen in the reaction vessel is displaced with nitrogen, 2.2 parts t-butyl hydroperoxide is added. This is followed by 0.0014 parts ferrous sulfate hepta hydrate in 1.1 parts demineralized water. When the reaction mixture is warmed to 60°C., there is a mild exothermic reaction which carries the reaction temperature briefly to about 66°–70°C. For the remainder of the 24 hour reaction time the temperature is held at about 60°C. After cooling to 25°–30°C., the total solids of the product is about 48.4% and the RSV 0.21 cp. To 220 parts of the above polymer solution is added sufficient (about 160 parts) sodium hydroxide solution (10 parts sodium hydroxide in 376 parts water) to adjust the pH to about 8.5. The neutralized polymer solution is diluted with 366 parts demineralized water and then heated to about 40°C. To the warm solution is added 106 parts epichlorohydrin and the reaction warmed further to react the epichlorohydrin at about 50°–55°C. Reaction is continued until the reaction mixture reaches a Gardner viscosity of about B+ (about 1.7 hours). At this time the reaction is quenched by the rapid addition of about 35 parts 37% hydrochloric acid to give a final pH of about 2. There is obtained 859 parts of a product containing about 20.7% total solids. A series of runs are made approximately as described above to give a total of about 7395 parts of product with about 2.4% total solids.

EXAMPLE 15

Example 13 is repeated using 254 parts (50 parts solids) of a epichlorohydrin modified tertiary amine polymer prepared as in Example J diluted with 505 parts water as the aqueous phase. The total solids of the resulting stable aqueous suspension is about 33%. Of the total solids about 4.7% is tertiary amine polymer and about 28% is fortified rosin.

EXAMPLE 16

A solution is prepared by dissolving 300 parts fortified rosin prepared as in Example D in 200 parts benzene in a suitable vessel provided with excellent agitation by means of an air motor driven propellor-type stirrer. To this well stirred solution is added 400 parts (50 parts solids) of aminopolyamide-epichlorohydrin resin prepared as in Example A. This results in a stable water-in-oil emulsion which is inverted by the rapid addition of 350 parts cold (about 20°C.) water while containing vigorous stirring. After addition of water is complete, stirring is continued for about 23 minutes to ensure complete inversion to a stable oil-in-water emulsion from which substantially all of the benzene is subsequently removed by distillation under reduced pressure with a pot temperature of about 40°C. The total solids of the resulting stable aqueous suspension is about 34%. Of the total solids about 4.8% is aminopolyamide-epichlorohydrin resin and about 29% is fortified rosin.

EXAMPLE 17

To determine the sizing efficiency of the aqueous dispersion of Example 1, handsheets are prepared using the dispersion as the sole sizing agent. To prepare the handsheets, a 50:50 blend of Rayonier bleached softwood kraft pulp and Weyerhaeuser bleached hardwood kraft pulp is suspended in standard hard water and beaten to 500 Canadian standard freeness in a Noble and Wood cycle beater. A 2-liter portion of the beater slurry, which has been diluted to 2.5% solids by weight are treated with sufficient alum to provide a pH of about 4.5. The slurry is then diluted to a consistency of 0.27% in the proportioner, using acid-alum dilution water.

The dilution water is prepared by reducing the pH of water of moderate hardness to 5.0 with sulfuric acid, then adding enough alum to provide 5 p.p.m. soluble aluminum. One-liter portions of proportioner pulp slurry are treated with sufficient of the size of Example 1 to give 0.4% size based on the dry weight of pulp. They are diluted further with acid alum dilution water to a deckle box consistency of 0.025% in order to form 40-pound basis weight (24 inches × 36 inches — 500 sheet ream) handsheet using a Noble and Wood sheet-making apparatus. A closed white water system is employed. Formed sheets are wet-pressed to 33% solids content and then dried at 240°F. on a steam drum drier. All handsheets are conditioned for at least 7 days at 72°F. and 50% relative humidity and are tested in this environment for size properties by using Hercules Sizing Test. Using No. 2 test solution to 80% reflectance the test time is about 139 seconds.

EXAMPLE 18

To determine the sizing efficiency of the aqueous dispersion of Example 1 at pH 6.5 the handsheet making of Example 17 is repeated using only 0.4% alum with the pH of the system adjusted to pH 6.5 as required. The results of the Hercules Sizing Test in this case is 82 seconds.

EXAMPLE 19

To determine the sizing efficiency of the aqueous suspension of Examples 2, 3, 4, 5, 13, 14 and 15 surface sizing experiments are preformed using bleached kraft paper (40 lbs. per 500 24 inches × 36 inches sheets) made at pH 6.5 with 0.5% added alum. The sheets are treated using a small laboratory horizontal size press by adding samples of the aqueous suspensions diluted to about 0.54% to the nip of the size press and passing sheets of paper through the solution before being squeezed by the rolls of the size press. Under these conditions the sheets pick up about 70% of their weight of size press solution to give about 0.38% size applied to the sheet. The sized sheets are dried about 18 seconds on a laboratory drum dryer with the surface temperature about 200°F. The sheets are aged four days and then tested using number two test solution with the Hercules Sizing Test to 85% reflectance. The following summarizes the results.

| Size of Example | Hercules Sizing Test Results in Seconds |
|---|---|
| 2 | 280 |
| 3 | 366 |
| 4 | 372 |
| 5 | 411 |
| 13 | 339 |
| 14 | 305 |
| 15 | 245 |

EXAMPLE 20

To determine the sizing efficiency of the aqueous suspension of Examples 7, 8, 9, 10, 11, and 12 surface sizing is carried out as in Example 19 except the sizing solutions are only about 0.45% so that only about 0.32% of each size is applied.

| Size of Example | Hercules Sizing Test to 85% Reflectance Results in Seconds |
|---|---|
| 7 | 183 |
| 8 | 311 |
| 9 | 239 |
| 10 | 217 |
| 11 | 216 |
| 12 | 140 |

EXAMPLE 21

In another demonstration of sizing efficiency of the aqueous suspension prepared as in Example 1, about 0.4% of the solids of this suspension and about 0.4% alum are applied in about 4.5% Penford Gum 280 (ethoxylated corn starch) to the surface of a 40 lb. bleach kraft water leaf sheet made at pH about 7.5. In this case No. 2 test solution used in the Hercules Sizing Test to 80% reflectance gives 252 seconds.

What I claim and desire to protect by Letters Patent is:

1. An aqueous fortified rosin dispersion consisting essentially of, by weight, (A) from about 5% to about 50% fortified rosin, (B) from about 0.5% to about 10% of watersoluble cationic resin dispersing agent, and (C) water to 100%, component (B) being selected from the group consisting of (i) a water-soluble polyaminopolyamide-epichlorohydrin resin, (ii) a water-soluble alkylenepolyamine-epichlorohydrin resin and (iii) a water-soluble poly(diallylamine)-epichlorohydrin resin, said fortified rosin being the adduct reaction product of rosin and an acidic compound containing the

group.

2. An aqueous fortified rosin dispersion consisting essentially of, by weight, (A) from about 10% to about 40% fortified rosin, (B) from about 1% to about 8% of water-soluble cationic resin dispersing agent, and (C) water to 100%, component (B) being selected from the group consisting of (i) a water-soluble polyaminopolyamide-epichlorohydrin resin, (ii) a water-soluble alkylenepolyamine-epichlorohydrin resin and (iii) a water-soluble poly(diallylamine)-epichlorohydrin resin, said fortified rosin being the adduct reaction product of rosin and an acidic compound containing the

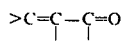

group.

3. The aqueous dispersion of claim 2 wherein component (B) is a water-soluble polyaminopolyamide-epichlorohydrin resin.

4. The aqueous dispersion of claim 3 wherein the polyaminopolyamide moiety of the resin is derived from adipic acid and diethylenetriamine.

5. The aqueous dispersion of claim 2 wherein component (B) is a water-soluble alkylenepolyamine-epichlorohydrin resin.

6. The aqueous dispersion of claim 2 wherein component (B) is a water-soluble poly(diallylamine)-epichlorohydrin resin.

7. The aqueous dispersion of claim 2 wherein the fortified rosin is extended with a fortified extender in an amount of from about 10% to about 100% by weight based on the weight of fortified rosin.

8. The aqueous dispersion of claim 3 wherein the fortified rosin is extended with a fortified rosin extender in an amount of from about 100% by weight based on the weight of fortified rosin.

9. The aqueous dispersion of claim 4 wherein the fortified rosin is extended with a fortified rosin extender in an amount of from about 10% to about 100% by weight based on the weight of fortified rosin.

10. The aqueous dispersion of claim 5 wherein the fortified rosin is extended with a fortified rosin extender in an amount of from about 10% to about 100% by weight based on the weight of fortified rosin.

11. The aqueous dispersion of claim 6 wherein the fortified rosin is extended with a fortified rosin extender in an amount of from about 10% to about 100% by weight based on the weight of fortified rosin.

12. The aqueous dispersion of claim 2 wherein component (A) is a fortified rosin-rosin blend comprised of about 25% to about 95% fortified rosin and about 75% to about 5% rosin.

13. The aqueous dispersion of claim 3 wherein component (A) is a fortified rosin-rosin blend comprised of about 25% to about 95% fortified rosin and about 75% to about 5% rosin.

14. The aqueous dispersion of claim 4 wherein component (A) is a fortified rosin-rosin blend comprised of about 25% to about 95% fortified rosin and about 75% to about 5% rosin.

15. The aqueous dispersion of claim 5 wherein component (A) is a fortified rosin-rosin blend comprised of about 25% to about 95% fortified rosin and about 75% to about 5% rosin.

16. The aqueous dispersion of claim 6 wherein component (A) is a fortified rosin-rosin blend comprised of about 25% to about 95% fortified rosin and about 75% to about 5% rosin.

17. The aqueous dispersion of claim 2 wherein component (A) is a blend of fortified rosin, rosin, and fortified rosin extender said blend being comprised of about 25% to about 45% fortified rosin, about 5% to about 50% rosin, and about 5% to about 50% fortified rosin extender.

18. The aqueous dispersion of claim 3 wherein, component (A) is a blend of fortified rosin, rosin, and fortified rosin extender said blend being comprised of about 25% to about 45% fortified rosin, and 5% to about 50% rosin, and about 5% to about 50% fortified rosin extender.

19. The aqueous dispersion of claim 4 wherein component (A) is a blend of fortified rosin, rosin, and fortified rosin extender said blend being comprised of about 25% to about 45% fortified rosin, about 5% to about 50% rosin, and about 5% to about 50% fortified rosin extender.

20. The aqueous dispersion of claim 5 wherein component (A) is a blend of fortified rosin, rosin, and fortified rosin extender said blend being comprised of about 25% to about 45% fortified rosin, about 5% to about 50% rosin, and about 5% to about 50% fortified rosin extender.

21. The aqueous dispersion of claim 6 wherein component (A) is a blend of fortified rosin, rosin, and fortified rosin extender said blend being comprised of about 25% to about 45% fortified rosin, about 5% to about 50% rosin, and about 5% to about 50% fortified rosin extender.

* * * * *